No. 827,070. PATENTED JULY 24, 1906.
J. E. MINTER.
SEWER PIPE JUNCTION CUTTER.
APPLICATION FILED OCT. 11, 1905.
2 SHEETS—SHEET 1.
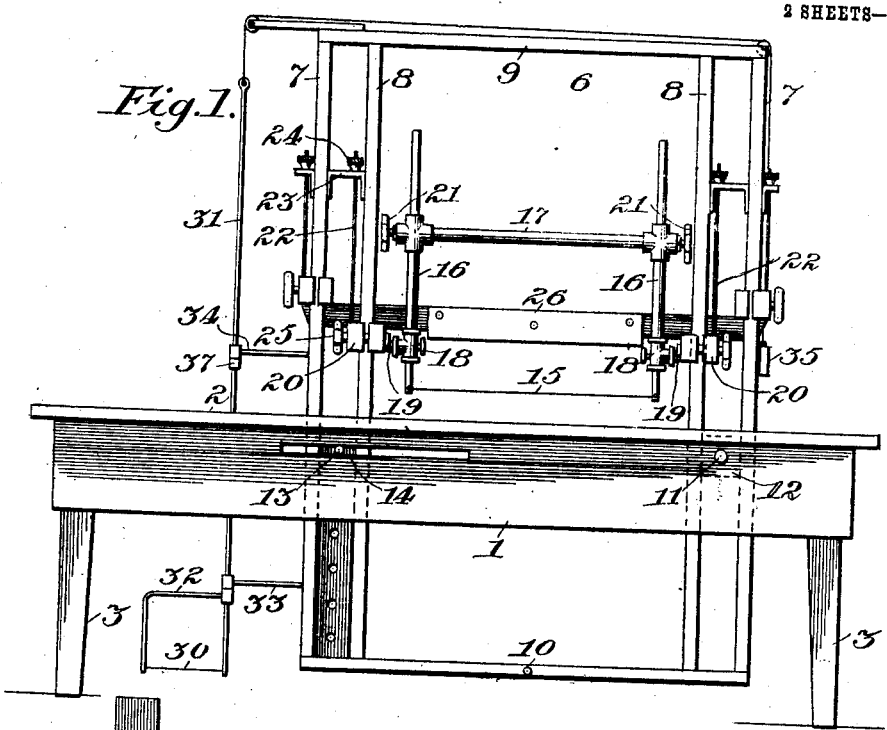
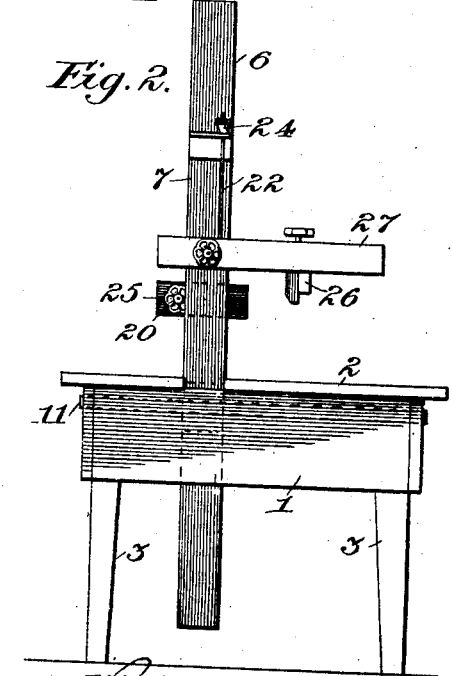
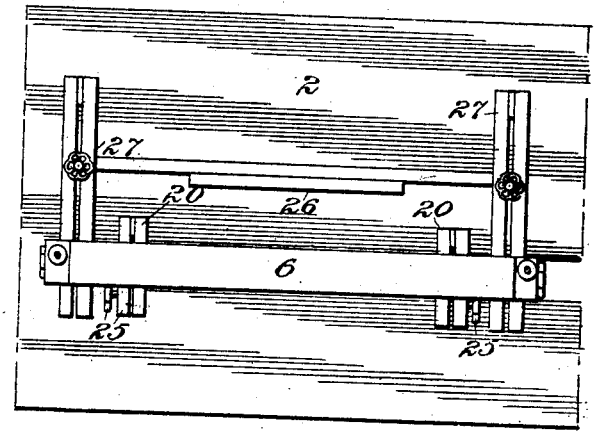
Witnesses:
Inventor:
John E. Minter
by William F. Hall
his Attorney.

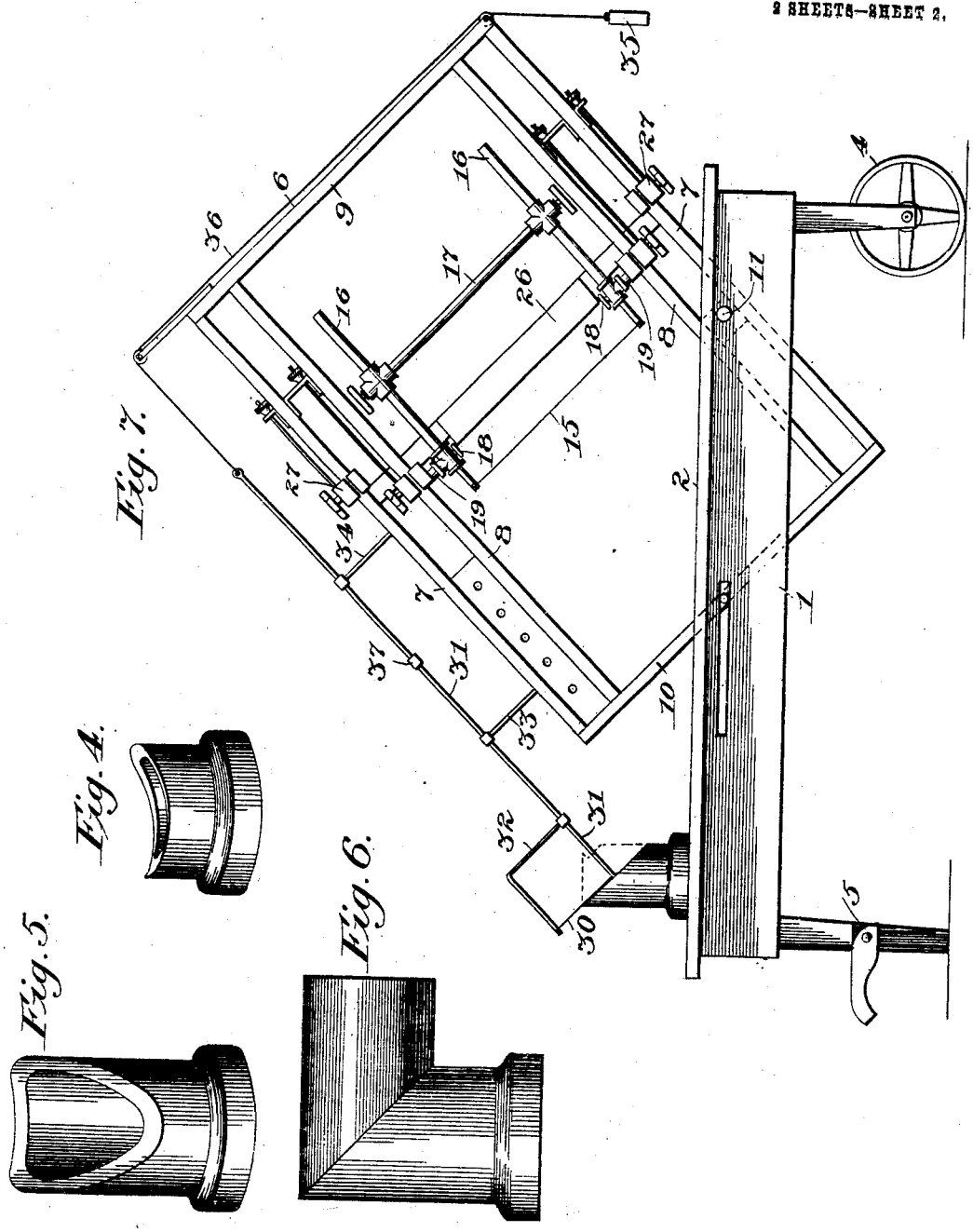

UNITED STATES PATENT OFFICE.

JOHN E. MINTER, OF MACON, GEORGIA.

SEWER-PIPE-JUNCTION CUTTER.

No. 827,070.                Specification of Letters Patent.               Patented July 24, 1906.

Application filed October 11, 1905. Serial No. 282,305.

*To all whom it may concern:*

Be it known that I, JOHN E. MINTER, a citizen of the United States, residing at Macon, in the county of Bibb and State of Georgia, have invented certain new and useful Improvements in Sewer-Pipe-Junction Cutters, of which the following is a specification.

My invention relates to machines for cutting or trimming the ends of pipes while in a plastic condition for the purpose of forming seats thereon to fit against or within a receiving-seat formed in or on a pipe to be joined thereto.

The object of the invention is to provide a machine which is particularly simple in construction and by means of which the ends of pipes or the like may be expeditiously trimmed or cut at various inclinations and on various radii in the manufacture of pipes having T or Y branches and in cutting corresponding ends on the abutting sections of pipes composed of two or more sections disposed at angles to each other.

The invention includes the parts and the combination and arrangement of component parts to be hereinafter described, and particularly pointed out in the claims.

The invention is susceptible of various embodiments, and in the accompanying drawings I have shown a preferable exemplification thereof, which will be described in detail hereinafter.

In the drawings, Figure 1 shows the machine or apparatus in side elevation. Fig. 2 is an end view of the machine. Fig. 3 is a plan view thereof. Fig. 4 is a perspective view of a pipe, showing one character of seat cut by the machine. Fig. 5 is a similar view of a pipe, showing another character of seat cut by the machine. Fig. 6 is a view of a pipe made in two sections, the abutting ends of which sections are cut by the machine. Fig. 7 is a side elevation of a modified construction of base.

My invention includes generally a suitable base or support, a frame adjustable in reference to the base for the purpose of varying the inclination of the path of travel of the cutters, a cutter adjustably mounted in the frame designed to be oscillated in arcs of varying radii for cutting curved seats or ends on the pipes operated upon, and a second cutter designed to be moved or rotated in a rectilinear direction for cutting straight ends upon the pipes operated upon thereby.

The invention further includes means for preventing the tearing or breaking of the edge of the pipe acted upon in the final effective movement of the oscillating cutter.

The base or support is designated by 1 in the accompanying drawings and includes generally a horizontally-disposed table 2 for supporting the pipes to be treated and other parts in which the cutter-frame is mounted. The base 1 is preferably constructed similar to the ordinary bench in which the top constitutes the table 2 and includes ordinary supporting-legs 3, although, as shown in Fig. 7, for convenience in shifting the machine instead of the legs 3, the base may be supported at one end upon a wheel 4 and at its opposite end upon sectional legs 5, designed to have the lower sections thereof turned up at right angles to the upper sections to provide handles in order that the machine may be trundled about in a similar manner to a truck or wheelbarrow.

The cutter-frame is designated by 6, and in the illustrated exemplification thereof it includes companion side bars 7 8 and upper and lower bars 9 10, the whole forming a rigid rectangular frame. This frame is movable in slots in the table 2, is pivotally supported beneath the table 2 in the base by means of a pivotal pin 11 extending transversely through the side of the base and through a block 12, fixed between side bars 7 8 at one side of the frame, and is adjustably connected to the base at its other side by means of a removable pin 13, designed to engage one of a series of openings in the sides of the base and an opening in a block 14, corresponding to the block 12, which is fixed between the other side bars 7 8.

The oscillating cutter 15 is suitably mounted in the frame 6 in such manner that its cutting-surface may move in arcs of varying radii and in varying planes above the surface 2. As shown herein, the cutter proper is formed by a wire drawn taut between the ends of a frame comprising side bars 16 and a cross-bar 17. The bars 16 are slidably mounted in contiguous bearings 18, provided with trunnions 19, journaled in brackets 20, slidably mounted on the bars 8. The upper ends of the bars 16 extend through openings or sockets in the ends of the bars 17 and are held against turning movement by handscrews 21. By loosening these screws the bars 16 may be rotated in order to take up any slack in the wire constituting the cutter proper. Associated with each bracket 20 is an adjusting-rod 22, having its lower end suitably connected to the bracket and its upper end extending through a bracket 23, projecting laterally from the contiguous bar 8, said end being surmounted by a hand-wheel 24, finding a bearing on the bracket 23, by means of which the rod 22 may be raised and lowered. For holding the brackets 20 in adjusted positions a hand-screw 25 is associated with each of the same. The means for preventing the tearing or breaking of the edge of the pipe under treatment shown in the illustrated embodiment of my invention includes a bearing-bar 26, adjustably mounted between horizontally-disposed arms 27, which are adjustably secured to the bars 7 in a similar manner to that described for adjustably securing the brackets 20 to the bars 8. The bar 26 is intended to form a rest for the rear edge of the pipe under treatment and is therefore adjustably mounted as described, so that it may be shifted to properly coact with the cutter in the different adjustments of the latter.

For cutting or trimming the edge of a branch pipe in making a T or Y joint the cutter 15 is employed. To cut a pipe for a T-joint, the frame 6 is held in a direct vertical position, so that the cutter 15 will be maintained in a horizontal position. In order to trim the pipe, it is only necessary to adjust the cutter 15 a distance above the surface 2 corresponding to the length of the pipe to be trimmed and to then tilt the cutter-frame to one side, so that the axis of the pipe may be brought into alinement with the axes of the trunnions 19, the bar 26 having been adjusted so that it will bear against the rear surface of the pipe at the line of cut, and then to oscillate the cutter-frame by drawing upon the bar 17, which will cause the cutting-wire to sweep across the end of the pipe and properly cut or trim the edge of the latter.

For cutting a Y-joint the same manipulation of the cutter and bar 26 is followed, but the frame 6 as an entirety is shifted out of the perpendicular to the position indicated in Fig. 7. The degree to which the frame is inclined is dependent upon the degree of inclination at which it is desired to cut the end of the pipe.

The rotating cutter which is employed for trimming or cutting straight ends upon pipes is indicated by 30, the same consisting of a wire stretched taut between the end of a rod 31 and the end of a bracket 32, secured to said rod. The rod 31 is supported in such a manner that it may be shifted longitudinally and may also be turned about its axis. In the accompanying drawings the rod is shown as mounted in the ends of brackets 33 34, projecting from one of the bars 7. The cutter 30 is normally held in an elevated position by a weight 35, attached to a cord 36, guided over suitable rollers and connected to the upper end of bar 31. This weight normally holds a stop 37 on the bar 31 into engagement with the bracket 34.

In cutting or trimming a pipe with the cutter 30 the former is supported upon the table 2 in such a position that the axis of the opening at the end trimmed will register with the rod 31, the cutter being adjusted to the proper height. In order to properly register the axis of the pipe with the rod, it is sometimes necessary to break away a portion of the pipe, as indicated in Fig. 7. When the parts are in proper position, the cutter is rotated with the rod 31 as an axis, and in this manner said cutter will trim a straight edge upon the end of the pipe at any desired inclination, dependent upon the inclination of the frame 6.

The construction and operation of my invention will be readily understood upon reference to the foregoing description and accompanying drawings, and it will be appreciated that the parts and combinations recited may be varied within a wide range without departing from the spirit and scope thereof.

Having thus described the invention, what is claimed as new, and desired to be secured by Letters Patent, is—

1. In a pipe-cutter, the combination with a base, of a rectangular frame pivotally mounted in the base, said frame including double side bars, an oscillating cutter mounted between the innermost side bars, brackets secured to one of the outermost side bars, and a rotating cutter mounted in the brackets.

2. In a pipe-cutter, the combination with a base, of a rectangular frame pivotally mounted in the base, said frame including double side bars, an oscillating cutter mounted between the innermost side bars, brackets secured to one of the outermost side bars, and a rotating cutter mounted in the brackets, comprising a rod journaled in the ends of said brackets, a bracket secured to said rod, and a wire stretched between the end of said rod and the last-named bracket.

3. In a pipe-cutter, the combination with a base, a frame including double side bars, a pivotal connection between one side of the frame and the base, a detachable adjustable connection between the other side of the frame and the base, a cutter-frame provided with trunnions, brackets adjustably mounted on the innermost side bars of the first frame having bearings for said trunnions, a bearing-bar adjustably mounted between the outermost side bars of the first frame, a second cutter comprising a rod, a bracket secured to the end thereof, and a wire stretched between the end of the rod and the end of the bracket, brackets secured to one of said outermost side bars in which said rod is rotatable and longitudinally movable, and a weight having connections to the rod for normally holding the second cutter in elevated position.

4. In a pipe-cutter, the combination with a base, a frame including double side bars, a pivotal connection between one side of the frame and the base, a detachable adjustable connection between the other side of the frame and the base, a cutter-frame provided with trunnions, brackets adjustably mounted on the innermost side bars of the first frame having bearings for said trunnions, a bearing-bar adjustably mounted between the outermost side bars of the first frame, a second cutter comprising a rod, a bracket secured to the end thereof, and a wire stretched between the end of the rod and the end of the bracket, and brackets secured to one of said outermost side bars in which said rod is rotatable and longitudinally movable.

In testimony whereof I have hereunto signed my name, in the presence of two attesting witnesses, at Macon, in the county of Bibb and State of Georgia, this 22d day of September, 1905.

J. E. MINTER.

Witnesses:
W. MERCER MORRIS,
J. M. STEPHENS.